(12) United States Patent
Ji et al.

(10) Patent No.: US 9,326,303 B2
(45) Date of Patent: Apr. 26, 2016

(54) DEVICE-TO-DEVICE COMMUNICATION METHOD AND APPARATUS FOR USE IN WIRELESS COMMUNICATION SYSTEM

(71) Applicant: Samsung Electronics Co., Ltd., Suwon-si, Gyeonggi-do (KR)

(72) Inventors: Hyoungju Ji, Seoul (KR); Yongjun Kwak, Yongin-si (KR); Younsun Kim, Seongnam-si (KR); Sangmin Ro, Seoul (KR); Juho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 29 days.

(21) Appl. No.: 14/201,203

(22) Filed: Mar. 7, 2014

(65) Prior Publication Data
US 2014/0256369 A1    Sep. 11, 2014

(30) Foreign Application Priority Data

Mar. 8, 2013 (KR) .......................... 10-2013-0025311

(51) Int. Cl.
| | |
|---|---|
| H04B 7/00 | (2006.01) |
| H04W 76/02 | (2009.01) |
| H04W 8/00 | (2009.01) |
| H04L 1/00 | (2006.01) |
| H04W 48/14 | (2009.01) |
| H04W 56/00 | (2009.01) |
| H04W 72/00 | (2009.01) |
| H04W 92/18 | (2009.01) |

(52) U.S. Cl.
CPC .............. *H04W 76/021* (2013.01); *H04L 1/00* (2013.01); *H04W 8/005* (2013.01); *H04W 48/14* (2013.01); *H04W 56/0025* (2013.01); *H04W 72/00* (2013.01); *H04W 76/023* (2013.01); *H04W 92/18* (2013.01)

(58) Field of Classification Search
CPC ... H04W 8/005; H04W 92/18; H04W 56/001; H04W 76/021; H04W 48/16; H04W 40/246; H04W 56/00; H04W 56/002; H04W 76/02; H04W 76/025
USPC .................. 455/7, 13.1, 11.1, 434, 343.3, 515
See application file for complete search history.

(56) References Cited

U.S. PATENT DOCUMENTS

| | | | |
|---|---|---|---|
| 2014/0003262 A1* | 1/2014 | He et al. ......................... | 370/252 |
| 2014/0269419 A1* | 9/2014 | Han et al. ...................... | 370/254 |

* cited by examiner

*Primary Examiner* — Tu X Nguyen
(74) *Attorney, Agent, or Firm* — Jefferson IP Law, LLP

(57) ABSTRACT

A method for allowing terminals to exchange discovery or synchronization signals to determine their presences among each other within a service area of a base station is provided. The method includes collecting multicast identifiers of another terminal for use in multicast communication, receiving a multicast control channel for Device-to-Device (D2D) multicast communication, performing Cyclic Redundancy Check (CRC) on the received multicast control channel using the collected multicast identifiers, and receiving, when the CRC is successful, the D2D multicast according to the multicast control channel. The D2D communication method and apparatus is advantageous in that the D2D terminal is capable of transmitting the discovery or synchronization signal to discover the neighbor terminals without disturbing downlink or uplink communication between the base station and the terminal, wherein the base station configures the resource for D2D communication so as to support D2D communication without an inter-device interference.

10 Claims, 14 Drawing Sheets

DEVICE-TO-DEVICE COMMUNICATION METHOD AND APPARATUS FOR USE IN WIRELESS COMMUNICATION SYSTEM

CROSS-REFERENCE TO RELATED APPLICATION(S)

This application claims the benefit under 35 U.S.C. §119 (a) of a Korean patent application filed on Mar. 8, 2013 in the Korean Intellectual Property Office and assigned Serial number 10-2013-0025311, the entire disclosure of which is hereby incorporated by reference.

TECHNICAL FIELD

The present disclosure relates to a Device-to-Device (D2D) communication method and an apparatus for use in a wireless communication system. More particularly, the present disclosure relates to a method for allowing terminals to exchange discovery or synchronization signals to determine their presences among each other within a service area of a base station, wherein the base station allocates frequency, time, and/or space resources.

In addition, the present disclosure relates to a method for sorting D2D communication Identifiers (IDs) into at least two D2D communication ID groups for discovery and synchronization signal transmission, for generating at least two discovery or synchronization signals based on the D2D communication ID sets, and for unicasting and broadcasting/multicasting the discovery or synchronization signals using the communication ID sets.

BACKGROUND

A mobile communication system enables users to communicate on the move and has evolved to being capable of providing a high speed data communication service as well as a voice telephony service.

A Long Term Evolution Advanced (LTE-A) network is designed to provide a high speed packet-based communication of the data rate greater than, as much as 3 to 10 times, the data rate of a current service and aims at commercial deployment around 2014 timeframe.

Meanwhile, a lot of research on D2D communication has been conducted since the 2000s and aims to support data communications between nearby terminals located in the service area of the same or different base stations without assistance of radio access networks while reducing load of signals passing the radio access networks of base stations and the wired network connecting the radio access networks. In the following description, the term 'LTE system' is used to include both the LTE system of the related art and LTE-A systems.

The D2D communications underlying cellular communication system entail interference problem because the D2D communication between D2D terminals uses the same frequency resource as the cellular communication between a terminal and a base station. There is, therefore, a need for a method for controlling interference and managing the resource efficiently. In D2D communication, the D2D terminal has to be aware of the presence of nearby terminals and thus, a need exists for a method for advertising its presence and detecting the advertisement signals broadcast by other terminals. This advertisement signal has to be transmitted without disturbing the cellular communication between a base station and a terminal.

The D2D communication also has to support broadcast and multicast functionality for the terminal to transmit the same data to a plurality of other terminals as well as unicast functionality. Accordingly, a need exists for a method for allowing a terminal to receive signals broadcast by a plurality of terminals efficiently.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and a method for allowing terminals to exchange discovery or synchronization signals to determine their presences among each other within a service area of a base station, wherein the base station allocates frequency, time, and/or space resources.

In accordance with an aspect of the present disclosure, a communication method for a terminal in a mobile communication system is provided. The communication method includes collecting multicast identifiers of another terminal for use in multicast communication, receiving a multicast control channel for Device-to-Device (D2D) multicast communication, performing Cyclic Redundancy Check (CRC) on the received multicast control channel using the collected multicast identifiers, and receiving, when the CRC is successful, the D2D multicast according to the multicast control channel.

Another aspect of the present disclosure is to provide a method for performing CRC on the multicast control channel using an identifier of the terminal and performing, when the CRC is successful, the D2D multicast according to the multicast control channel.

Another aspect of the present disclosure is to provide a method for receiving a unicast control channel for D2D unicast communication, performing CRC on the unicast control channel using a unicast reception identifier of the terminal, and receiving, when the CRC is successful, D2D unicast according to the unicast control channel.

Another aspect of the present disclosure is to provide a method for receiving a unicast control channel for D2D unicast communication, performing the CRC on the unicast control channel using a unicast transmission identifier of the terminal, and performing, when the CRC is successful, D2D unicast transmission according to the unicast control channel.

Another aspect of the present disclosure is to provide a method for feeding back information on the collected multicast identifiers and D2D channel.

In accordance with another aspect of the present disclosure, a communication method for a base station in a mobile communication system is provided. The communication method includes transmitting an identifier allocated to a first terminal, generating a control information for D2D communication of the first terminal, generating a first CRC on the control information using an identifier of the first terminal and transmitting the control channel including the control information and the first CRC, wherein the control information includes the control information of allocating resource for the first terminal to multicast to other terminals.

Another aspect of the present disclosure is to provide a method for generating unicast reception control information and unicast transmission control information for unicast communication between the first terminal and a second terminal, generating a second CRC for the unicast reception control information using the reception unicast identifier of the first terminal, generating a third CRC for unicast transmission control information using a transmission identifier of the second terminal, transmitting a second control channel including the unicast reception control information and the second CRC, and transmitting the third control channel including the unicast transmission control information and the third CRC.

In accordance with another aspect of the present disclosure, a terminal of a mobile communication system is provided. The terminal includes a control channel receiver configured to collect multicast identifiers of another terminal for use in multicast communication and to receive a multicast control channel for D2D multicast communication, a controller configured to perform CRC on the received multicast control channel using the collected multicast identifiers, and a receiver configured to receive, when the CRC is successful, the D2D multicast according to the multicast control channel.

In accordance with another aspect of the present disclosure, a base station of a mobile communication system is provided. The base station includes a transceiver configured to transmit an identifier of a first terminal, a control channel generator configured to generate a control channel for D2D communication of the first terminal, and a controller configured to generate a first CRC on the control information using an identifier of the first terminal and to transmit a control channel comprising the first CRC for the control information, wherein the control information includes the control information of allocating resource for the first terminal to multicast to other terminals.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

The same reference numerals are used to represent the same elements throughout the drawings.

DETAILED DESCRIPTION

Figure 1:
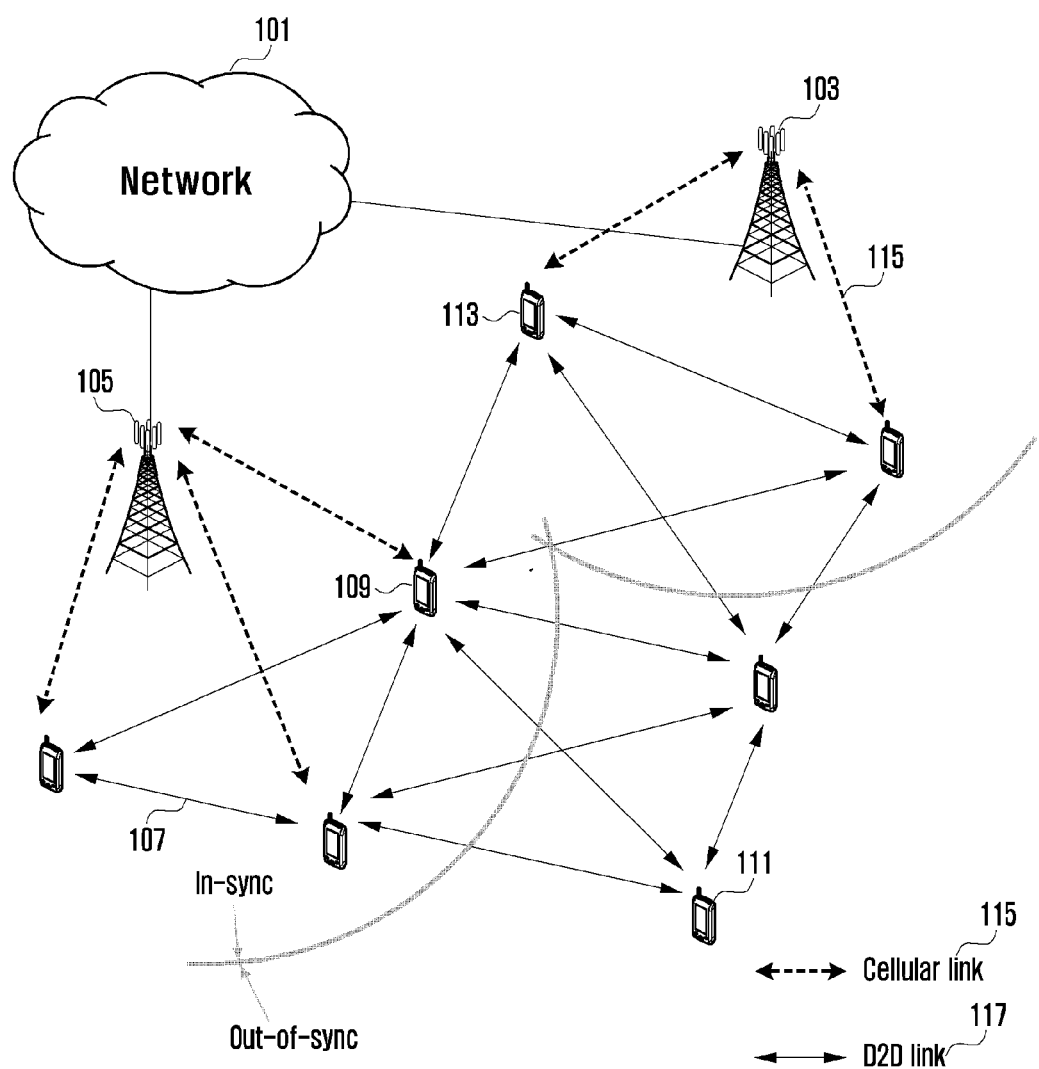
FIG. 1 is a diagram illustrating a Device-to-Device (D2D) communication system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Embodiments of the present disclosure relate to D2D communication using uplink or downlink in a communication system supporting downlink signal transmission from a base station to terminals and uplink signal transmission from the terminals to the base station. Examples of the downlink signal include data channel carrying information transmitted to the terminal, a control channel carrying control signals, and a Reference Signal (RS) for use in channel measurement and feedback. Examples of the uplink signal include data channel carrying information transmitted to the base station, a control channel carrying control signals, and a Sounding Reference Signal (SRS) for use at the base station in measuring channel of the terminal.

The base station transmits the data and control information to the terminal through a Physical Downlink Shared Channel (PDSCH) and a Downlink Control Channel (DL CCH).

The uplink channels include a data channel, a control channel, and a reference signal, the data channel corresponding to a Physical Uplink Shared Channel (PUSCH) and the control channel corresponding to a Physical Uplink Control Channel (PUCCH).

The base station may transmit various kinds of reference signals including a Common Reference Signal (CRS), a Channel State Information Reference Signal (CSI-RS), a Demodulation Reference Signal (DMRS), and the like.

The CRS is transmitted across the entire downlink band for use in signal demodulation and channel measurement at all the terminals within the cell. In order to reduce the resource for CRS transmission, the base station transmits DMRS at the region scheduled for the terminal and CSI-RS to acquire channel information thereon on the time and frequency axes.

The terminal transmits a data channel (PUSCH) and a control channel (PUCCH) based on DMRS and SRS for uplink channel measurement. The SRS is mapped to the last symbol of a subframe, and PUSCH and PUCCH cannot be transmitted along with SRS simultaneously. Typically, the PUCCH is transmitted on the edges of the uplink bandwidth, and PUSCH across the entire band.

FIG. 1 is a diagram illustrating a D2D communication system according to an embodiment of the present disclosure.

Referring to FIG. 1, base stations 103 and 105 provide terminals 109 and 113 with a communication service within the coverage area defined by the reach of the synchronization signal of the base station. At this time, the data transmitted by the terminal is sent to the base station 105 via a network 101, and the base station 105 allocates a radio resource for delivering data through a cellular link 115 to the terminal 109. At this time, the communication service can be provided to the terminals 109 and 113 within the base station coverage area as well as a terminal 111 outside the base station coverage area and supports D2D communication as denoted by a reference number 107 through a D2D link 117.

Figure 2:
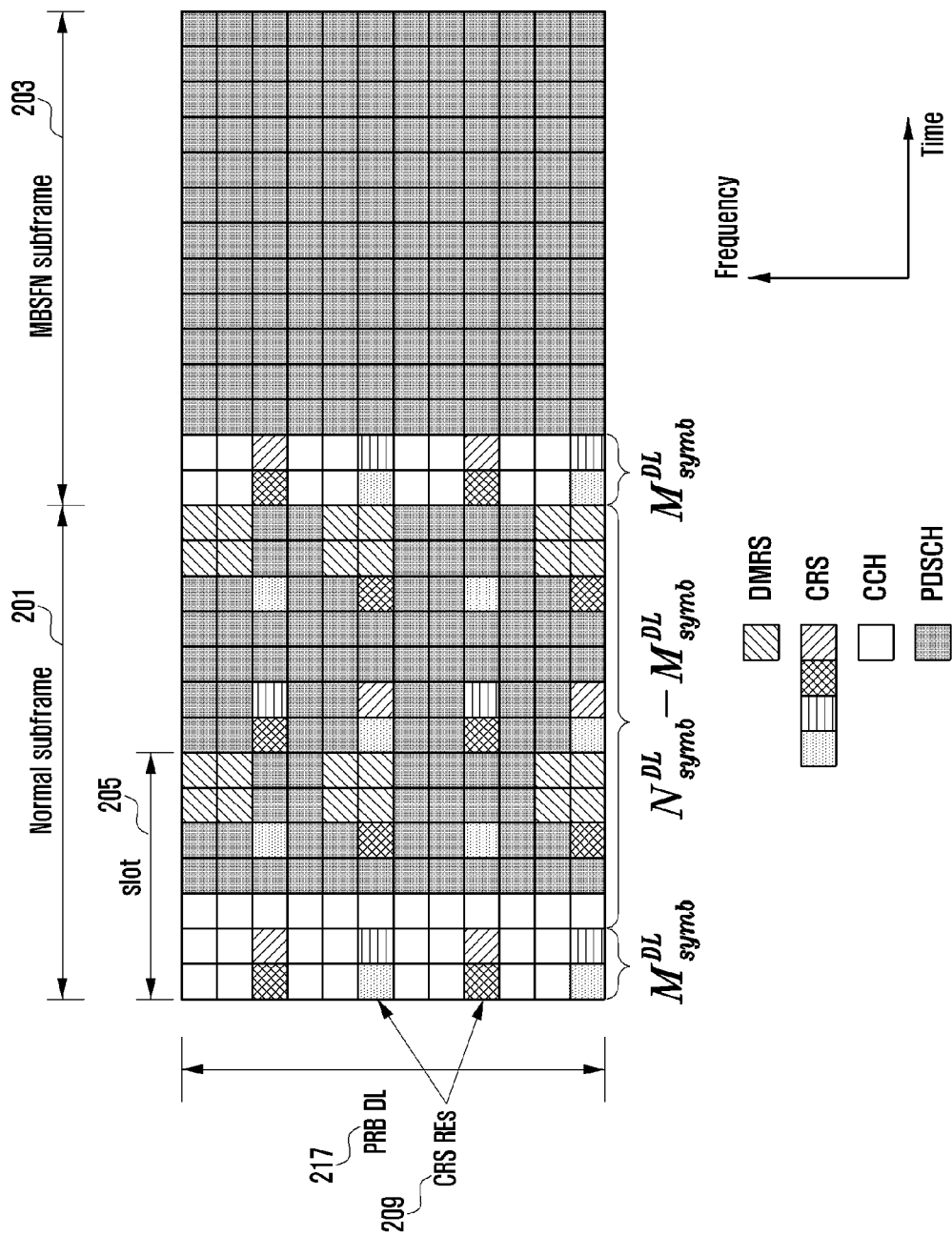
FIG. 2 is a diagram illustrating downlink subframes for use in a communication system according to an embodiment of the present disclosure.

FIG. 2 is a diagram illustrating downlink subframes for use in a communication system according to an embodiment of the present disclosure.

Referring to FIG. 2, the resource scheduling unit of the base station is a downlink subframe, and a subframe 201 consists of two slots, the subframe consisting of total $N_{symb}^{DL}$ symbols and carrying a control channel, a data channel, and a reference signal. Reference number 205 denotes a slot.

Among $N_{symb}^{DL}$ symbols, a $M_{symb}^{DL}$ symbol at the beginning of the subframe is used for transmitting a control channel, and the rest of the symbols $N_{symb}^{DL}$-$M_{symb}^{DL}$ can be used for transmitting a data channel.

The transmission bandwidth is divided into Resource Blocks (RBs) in the frequency domain, and each RB 217 consists of total $N_{sc}^{RB}$ subcarriers or Resource Elements (REs), the unit defined with two slots in the domain and one RB is referred to as a Primary RB (PRB) pair.

In order to measure a downlink channel, the base station transmits CRS (i.e., CRS REs 209) or CSI-RS for use at a terminal in channel measurement and, if the terminal reports the channel measurement result, the terminal becomes aware of the downlink channel state between the base station and the terminal.

The downlink subframe may be categorized into one of a Normal subframe 201 and a Multicast Broadcast Single Frequency Network (MBSFN) subframe 203 depending on the structural characteristic. These subframes differ from each other in that the MBSFN subframe has first two symbols identical with those of the normal subframe but no CRS in any of the rest of the symbols.

Figure 3:
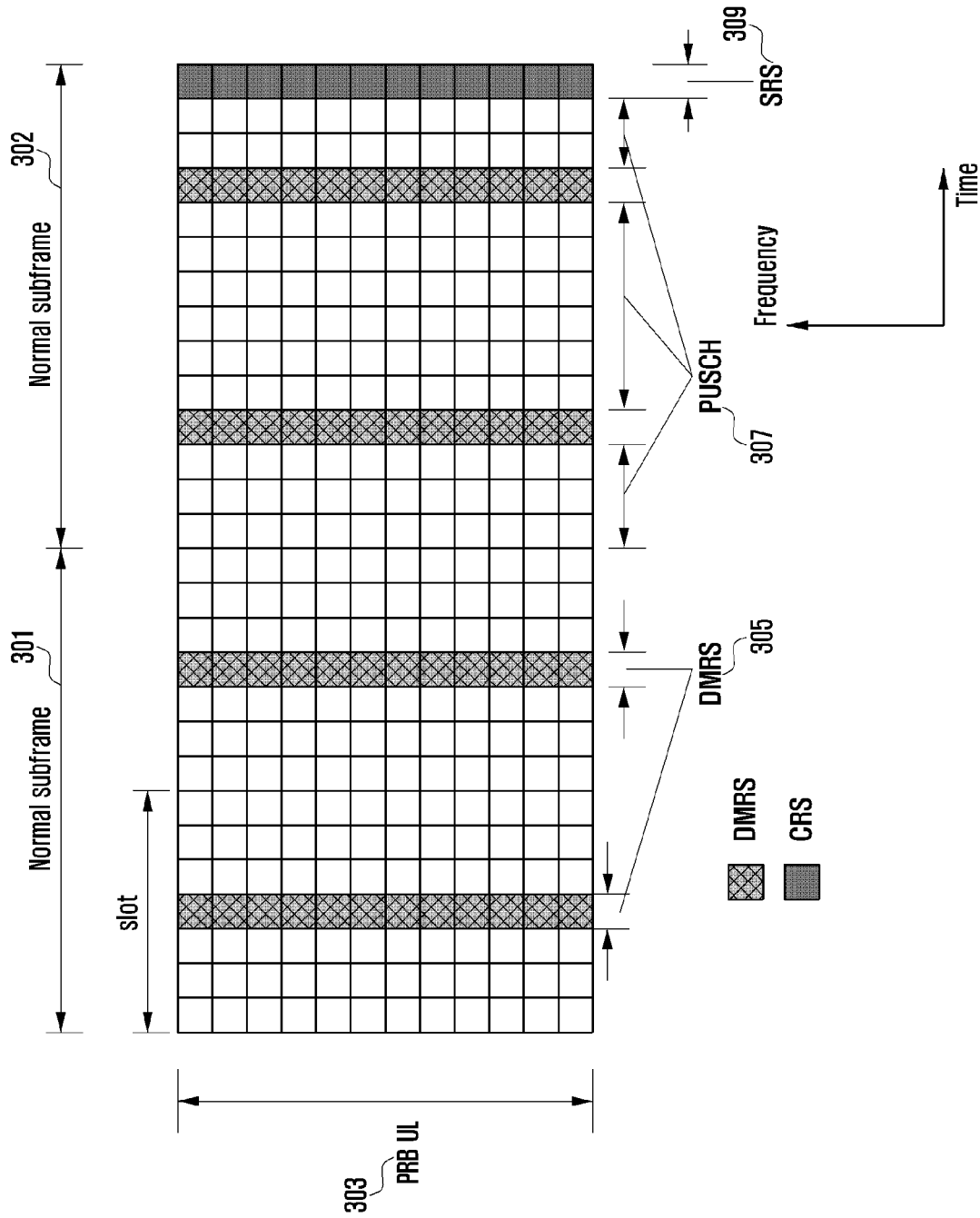
FIG. 3 is a diagram illustrating uplink subframes for use in a communication system according to an embodiment of the present disclosure.

FIG. 3 is a diagram illustrating uplink subframes for use in a communication system according to an embodiment of the present disclosure.

Referring to FIG. 3, the uplink channel measurement is performed in such a way that the base station instructs the terminal to transmit an SRS 309. More specifically, the base station receives the SRS 309 transmitted by the terminal to determine an uplink channel (i.e., a channel state, and the like).

The terminal uses an uplink subframe as a basic time unit, and each of uplink subframes 301 and 302 consists of two slots. The subframe consists of total $N_{symb}^{UL}$ symbols for use at the terminal in transmitting the control channel, a data channel 307, and a reference signal 305. Reference number 303 denotes a PRB UL.

The control channel (PUCCH) is located at the edge of the uplink band in the frequency domain and transmitted alternately by a slot at both edges.

As shown in FIG. 3, the reference signal (DMRS) 305 is mapped to some symbols in the allocation region such that the base station is capable of modulating the signal transmitted by the terminal. The SRS is transmitted at the last symbol of the subframe 302 and, at this time, no data channel is transmitted at the last symbol to which SRS is mapped.

Figure 4:
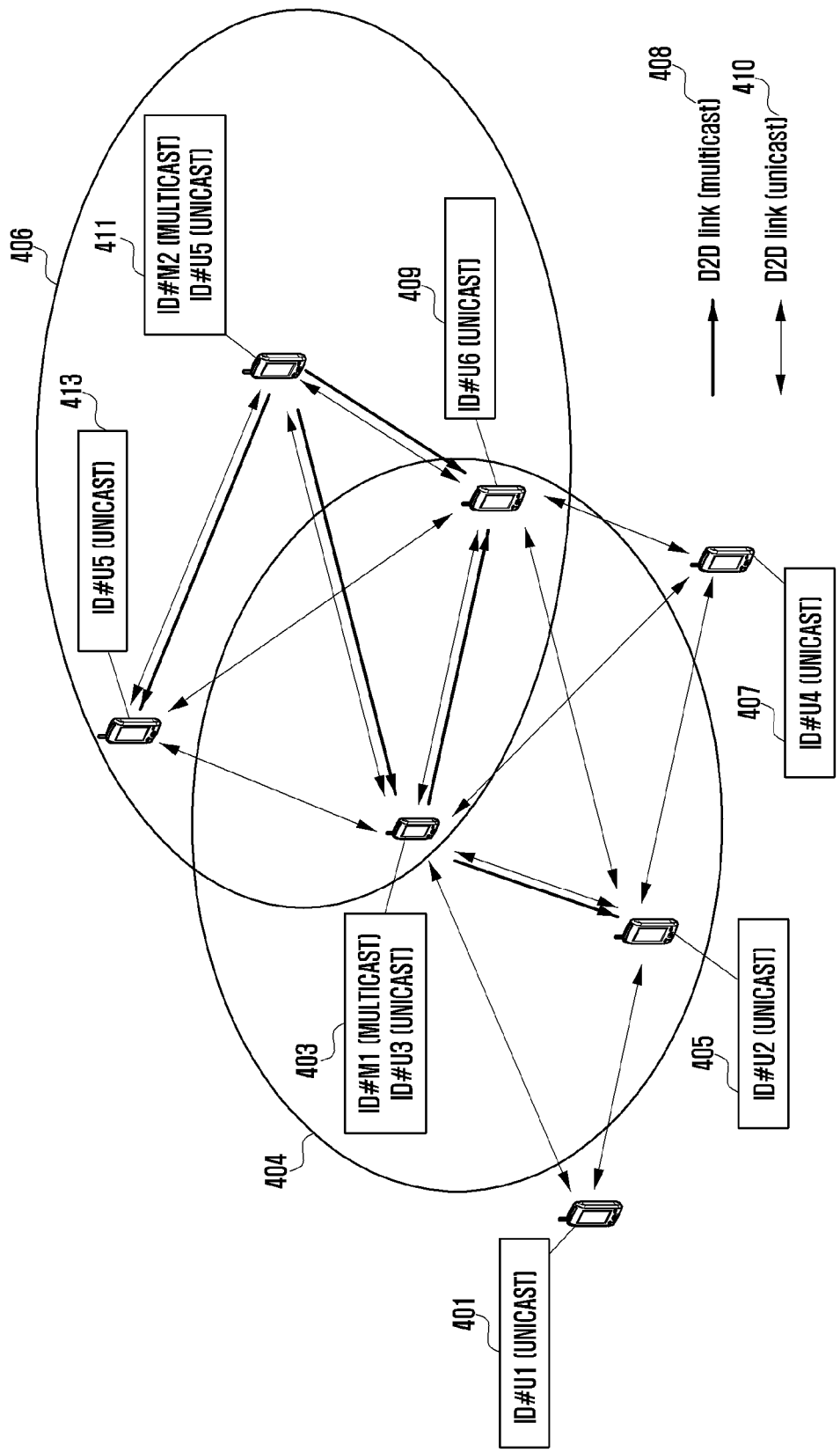
FIG. 4 is a diagram illustrating unicast and multicast/broadcast transmission links in a D2D communication system according to an embodiment of the present disclosure.

FIG. 4 is a diagram illustrating unicast and multicast/broadcast transmission links in a D2D communication system according to an embodiment of the present disclosure.

The D2D communication may be classified into two types of transmissions. The first type of transmission is the unicast transmission for a direct communication between two peers. The second type of transmission is the multicast/broadcast transmission in which a terminal transmits a multicast/broadcast signal such that other terminals in the signal transmission range receive the signal. The unicast transmission is a transmission of data to a specific user, such as voice data and a text message, and the multicast/broadcast transmission is a transmission of an advertisement, public information, traffic information to unspecified users, and the like.

Referring to FIG. 4, terminals 401, 405, 407, 409, and 413 are allocated D2D communication IDs for unicast and generate discovery or synchronization signals using the allocated D2D communication IDs. The terminal may receive the discovery or synchronization signals transmitted by other terminals according to the channel or distance between the terminals and, if the distance between terminals too far or the channel between the terminals too bad, the terminal may not receive the discovery or synchronization signals. For example, the terminal 401 may be assigned D2D communication ID #U1 for unicast transmission from the base station and may transmit the discovery or synchronization signal using the #U1. In this case, the terminals 405 and 403 can receive the signal transmitted by the terminal 401 but may not recognize the presence of the terminals 407, 409, 413, and 411 relatively far from the terminals 405 and 403. The terminal 411 has a coverage area 406 and may be allocated the D2D communication ID #M2 for multicast and D2D communication ID #U5 for unicast from the base station. The terminal 403 may be allocated the D2D communication ID #M1 for multicast and D2D communication ID #U3 for unicast from the base station. The terminal 403 may transmit different discovery or synchronization signals using the #M1 and #U3 or transmit the synchronization signal for multicast and the discovery signal for unicast. If the terminal 403 has a coverage area 404, the terminals 405 and 409 may receive the signal transmitted by the terminal 403. The individual signals may have different coverage areas and thus, different D2D communication ID groups. More specifically, the multicast D2D link 408 and unicast D2D link 410 may be different depending on the terminals. Here, the multicast communication includes broadcast communication.

In the D2D communication method and apparatus for use in the wireless communication system according to an embodiment of the present disclosure, the D2D terminal receives a D2D communication configuration information from the base station through higher layer signaling or transmits the discovery or synchronization signal configured on the downlink or uplink band along with the identity signal for D2D communication. The identity signal for supporting D2D communication is capable of distinguishing different types of D2D communications (i.e., multicast, broadcast, and unicast) and being transmitted in different discovery or synchronization signals, or multiple signals identical in type are transmitted in order for the terminal to detect the different types of D2D communication based on the discovery or synchronization signals.

The method for transmitting a discovery or synchronization signal in downlink or uplink is characterized in that the ID sets are configured for different types of D2D communication and transmitted in different types of signals. The different types of signals includes the synchronization signal and discovery signal or same types of signals using the same resource, i.e., the synchronization signal using the same resource or the discovery signal using a different resource. In an embodiment of the present disclosure, the discovery and synchronization signals are transmitted at different symbols in the time domain.

The terminal is allocated at least one downlink subframe resource from the base station for transmitting the discovery or synchronization signal on the downlink band where the terminal may suspend transmission when the base station transmits a signal or switches between transmitter and receiver in the terminal. The terminal may also use the region which is not used by the base station for transmitting the discovery or synchronization signal.

The terminal is allocated at least on a subframe resource from the base station for transmitting the discovery or synchronization signal, and the base station may schedule such that the terminal does not transmit any signal to the base station. In a case where some symbols are designated for a cell-specific common resource, e.g., an SRS transmission, in the configured subframe, the terminal may mute the corresponding region or use the region for switching between the transmitter and receiver in the terminal. The region which is not configured of a cell-specific resource region may be used for transmitting the discovery signal and synchronization signal.

The terminal is capable of receiving the resource configuration information for receiving the control channel for D2D data transmission and the resource configuration information for data transmission as well as the resource configuration information for transmitting the discovery signal and synchronization signals for D2D communication from the base station, and this information may include at least one subframe index.

The terminal may determine the control channel scan region in a case corresponding to the first ID group configured using the identifier received in the discovery or synchronization signal and receive the control channel information for multicast and broadcast communication through CRC check of the control channel using the received identifier in the control channel information reception region configured for receiving the control channel information for D2D multicast and broadcast communication from the base station. If a certain terminal receives an identifier included in the discovery or synchronization signal which it has transmitted through CRC check, the terminal may transmit data for broadcast or multicast in the region indicated in the control channel. If a certain terminal receives an ID in the discovery or synchronization signal through CRC check, the terminal may receive the data for broadcast or multicast in the region indicated in the control channel.

For example, in the D2D communication for broadcast, the terminal may determine the control channel to receive the control channel information and perform transmission or reception operation based on the received control information. For example, in a case where the terminal is the transmission terminal for broadcast, the terminal determines the control channel notified by the base station to know the resource region and data channel format for use in communication among terminals. Otherwise, in a case where the terminal is the reception terminal for receiving the broadcast, the terminal determines the control channel notified by the base station to know the resource region and data channel for use in the D2D communication. The reception terminal may receive data for broadcast. The transmission and reception terminals may determine the same control channel, the transmission terminal may acquire the information on the data channel for broadcasting data, and the reception terminal may acquire the information on the data channel for receiving broadcast data.

The terminal may determine a control channel scan region in a case corresponding to the second ID set using the ID received in the discovery or synchronization signal and receive the control channel information for unicast communication through CRC check on the control channel using the unicast identifier used in its transmission in the control channel information reception region configured for receiving the control channel information for unicast communication in D2D communication from the base station.

In another method for unicast transmission, the terminal may determine the control channel scan regions for transmission and reception in a case corresponding to the second ID set configured using the ID received in the discovery or synchronization signal and the terminal may receive the control channel information through CRC check on the control channel using the unicast identifier used its transmission in the control channel information reception region configured for receiving the control channel information for unicast communication in the D2D communication from the base station.

In another method for unicast transmission, the terminal may determine the control channel scan region for transmission in the first control channel region in a case corresponding to the second ID set configured using the ID received in the discovery or synchronization signal and the terminal may receive the control channel information through CRC check on the control channel using the unicast ide used for its transmission in the control channel information reception region configured for receiving the control channel information for unicast communication in the D2D communication from the base station. If the control channel is received in the control channel resource for transmission, the terminal performs data transmission. Otherwise, if the control channel is received in the resource for reception, the terminal may perform data reception in the region indicated in the control channel.

The terminal may transmit and receive the discovery and synchronization signal for D2D communication and then feed back the information on the found IDs and per-ID channel information to the base station.

In an embodiment of the present disclosure, the base station may not transmit a downlink subframe for facilitating discovery or synchronization signal transmission of the terminals for D2D communication. The downlink subframe having no transmission of the base station is configured as an MBSFN subframe of which first two symbols are assigned for the downlink control channel. In order for the terminal to transmit the discovery or synchronization signal for D2D communication, the base station may not receive any downlink subframe. In order to prevent the terminal from transmitting signals to the base station in the corresponding uplink subframe, the base station may not transmit any scheduling information for use in transmission at the corresponding subframe to the terminal. However, the base station may receive SRS transmitted by the terminal at the corresponding subframe.

In an embodiment of the present disclosure, the base station may inform the UE of at least one D2D communication ID group for discriminating among different services (i.e., unicast, multicast, and broadcast services) through higher layer signaling. In another embodiment of the present disclosure, the base station may inform the terminal of the signals (i.e., discovery and synchronization signals) for different types of services through higher layer signaling. In another embodiment of the present disclosure, the base station may notify the terminal of the different types of services using the same signal on different resources through higher layer signaling.

In an embodiment of the present disclosure, the base station may notify the terminal with the subframe having the resource for transmitting D2D communication data and the control channel resource for indicating the resource through higher layer signaling. At the corresponding subframe, the terminal receives the control channel for D2D communication and transmits data in the subframe indicated by the control channel or through higher layer signaling.

In an embodiment of the present disclosure, the terminal includes a controller which controls a discovery signal generator or a synchronization signal generator for generating the discovery or synchronization signal for D2D communication based on the control information received from the base station through higher layer signaling. The terminal may further include a multiplexer for multiplexing the signal transmitted to the base station and the D2D communication signals. The terminal may further include a control channel receiver for receiving the resource allocation information for D2D communication which is transmitted by the base station.

In an embodiment of the present disclosure, the base station may include a controller for configuring the higher layer signaling for D2D communication of the terminal, a control channel generator for configuring the control channel for D2D communication, and a multiplexer for multiplexing the signals transmitted to other terminals.

Figure 5:
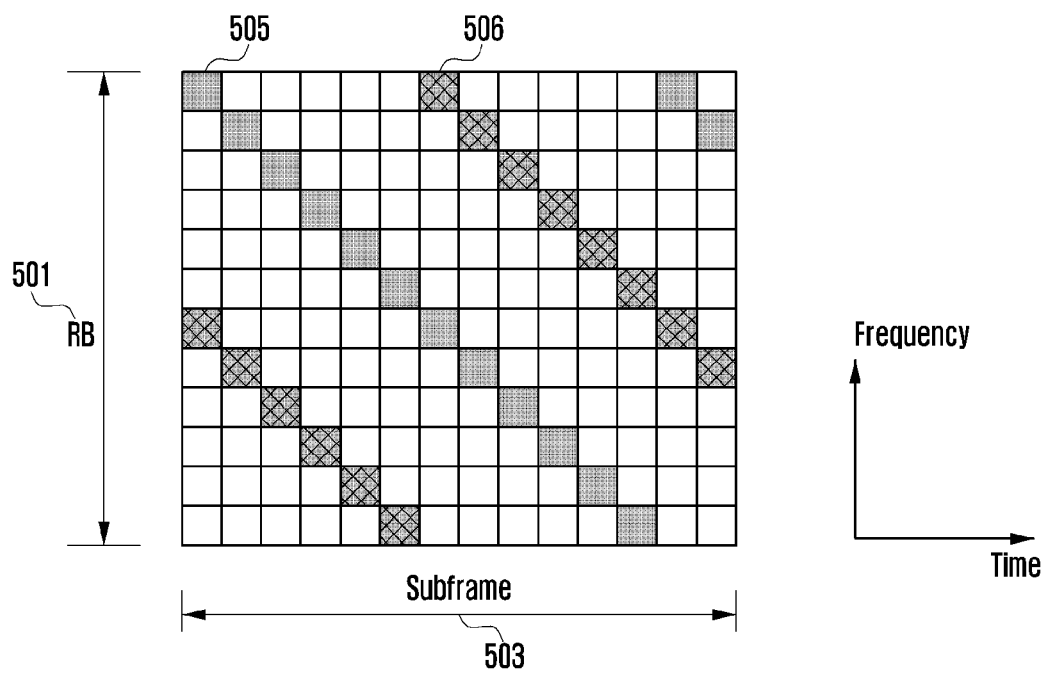
FIG. 5 is a diagram illustrating a time-frequency resource structure with a discovery signal for use in D2D communication according to an embodiment of the present disclosure.

FIG. 5 is a diagram illustrating a time-frequency resource structure with a discovery signal for use in D2D communication according to an embodiment of the present disclosure.

Referring to FIG. 5, the discovery signal is transmitted with the D2D communication ID, and the discovery signal transmission includes generating a sequence of a discovery signal transmitted with an ID or transmitting a specific resource, a code, a sequence, a scrambling sequence mapped to the ID, and the like. FIG. 5 shows a method for transmitting the discovery signal by an RE in the frequency and time symbol orders in an RB 501. Here, reference numbers 505 and 506 denote the discovery signal used by a terminal in a subframe 503, two discovery signals used by a terminal, or discovery signals used by different terminals.

Figure 6:
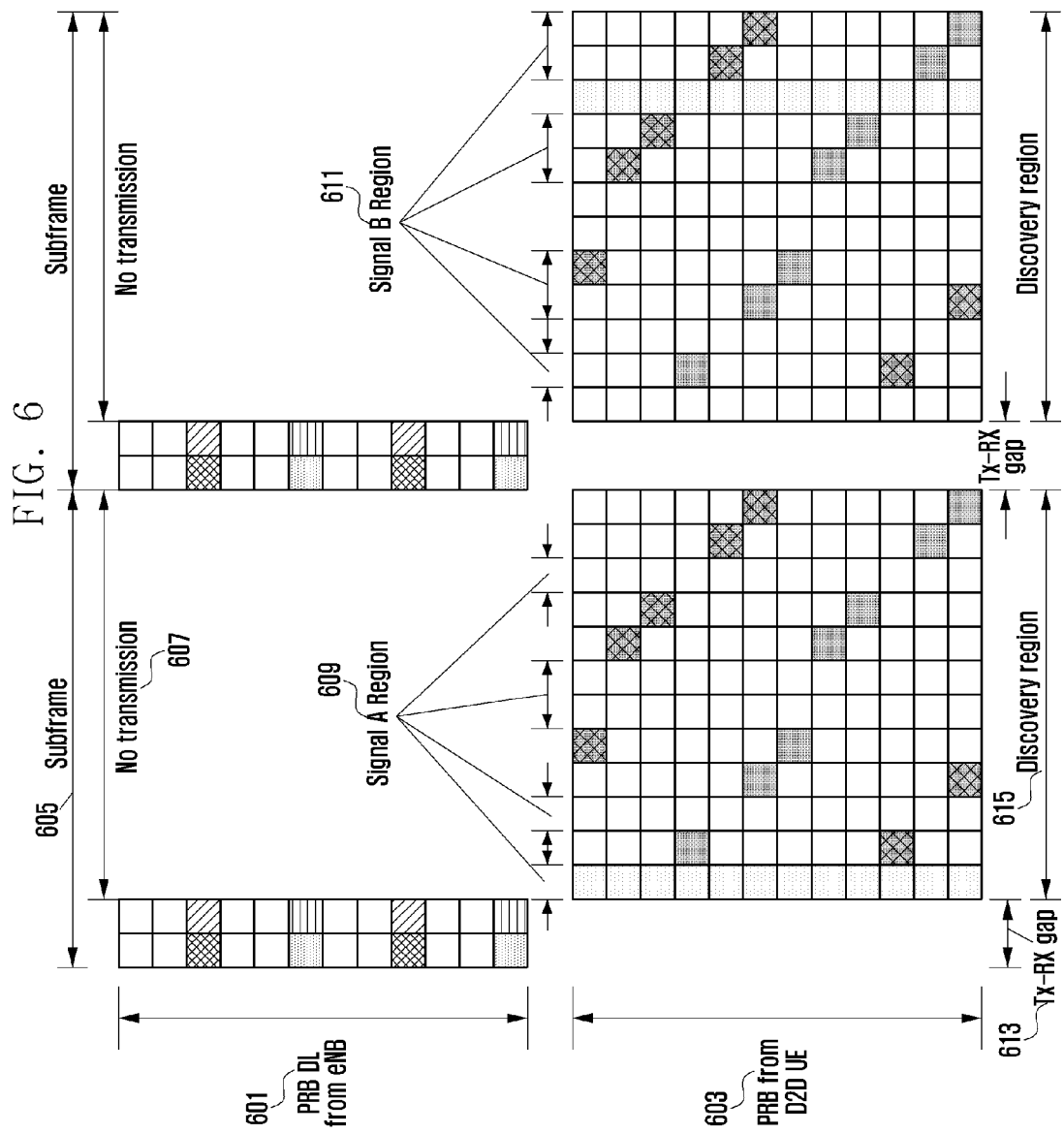
FIG. 6 is a diagram illustrating a principle of transmitting a discovery or synchronization signal for D2D communication in downlink according to an embodiment of the present disclosure.

FIG. 6 is a diagram illustrating a principle of transmitting a discovery or synchronization signal for D2D communication in downlink according to an embodiment of the present disclosure.

FIG. 6 shows the transmission operations of the base station in the subframe where the terminals transmit discover or synchronization signals for D2D communication.

Referring to FIG. 6, the base station notifies the UE of a subframe 605 including a discovery region 615 for transmitting a D2D discovery or synchronization signal through higher layer signaling. At this time, the base station performs transmission at the first few symbols but not the rest of the symbols 607 in the corresponding subframe. This is because the signal which a terminal transmits to another signal for D2D communication when the base station performs transmission at a relatively high power level may not be detected due to the strong signal from the base station. In order to overcome this issue, the base station may configure the corresponding subframe 605 as an MBSFN subframe of which first two symbols can be used for transmission to the terminal or configure the corresponding subframe 605 as the normal subframe carrying no downlink data. In this case, the base station transmits the CRS but not the discovery signal when the discovery signal of FIG. 5 and the CRS are mapped to the same symbol for supporting both the discovery and synchronization signals for D2D communication. Reference number 601 denotes a case where an evolved Node B (eNB) transmits a discovery or synchronization signal. Reference number 603 denotes a case where the terminal transmits discovery or synchronization signal when the base station has notified the terminal of the corresponding subframe 605 as the subframe for transmitting discovery and synchronization signal for D2D communication. Since the base station does not perform transmission at signals A and B regions 609 and 611, it is possible to transmit the discovery signal as depicted. Since symbols 613 are the symbols at which the base station may perform transmission to the terminal, they are not used for D2D communication but for the purpose of switching between transmission and reception for receiving the discovery or synchronization signals transmitted by another terminal after the terminal has transmitted the discovery signal.

FIG. 6 is directed to discovery and synchronization signals transmission in which the discovery and synchronization signals are configured independently. In order to multiplex the discovery and synchronization signals, the synchronization signal 609 and the discovery signal 611 may be transmitted at different symbols. In a case of configuring the synchronization and discovery signals in different structures, the synchronization signal may be used for D2D multicast while the discovery signal may be used for D2D unicast. An embodiment of the present disclosure also includes a method for using the different types of discovery signals 611 for unicast and multicast transmissions. In an embodiment of the present disclosure, the synchronization signal may be configured to use a Constant Amplitude Zero Autocorrelation (CAZAC) sequence matching the synchronization signal band given across one symbol of at least one PRB. Accordingly, in a case where a plurality of terminals perform transmission using orthogonal CAZAC sequences at the same symbol, the plurality of terminals can transmit the synchronization signals on the limited synchronization signal resource.

Figure 7:
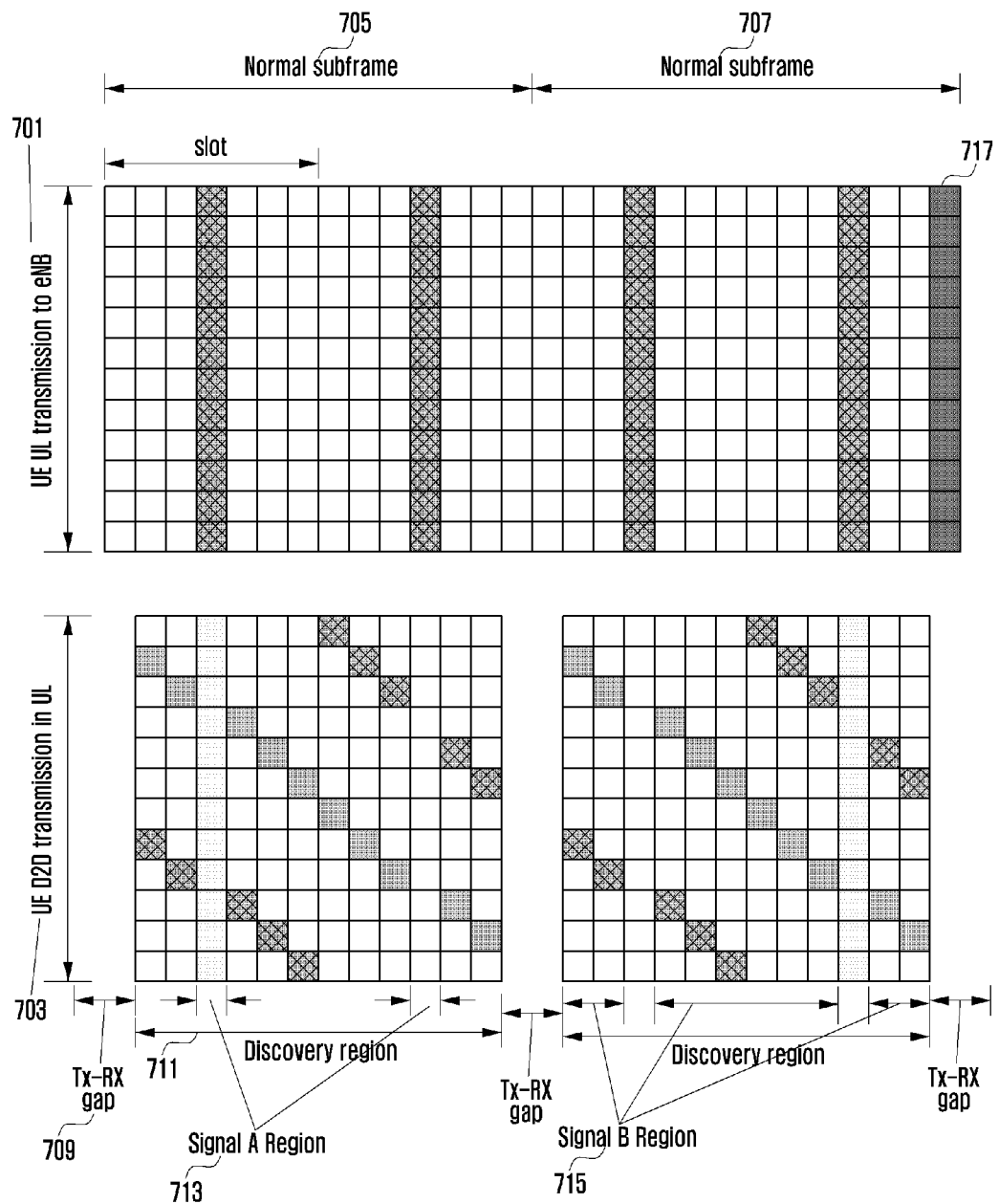
FIG. 7 is a diagram illustrating a principle of transmitting a discovery or synchronization signal for D2D communication in uplink according to an embodiment of the present disclosure.

FIG. 7 is a diagram illustrating a principle of transmitting a discovery or synchronization signal for D2D communication in uplink according to an embodiment of the present disclosure.

FIG. 7 shows the transmission operations of the terminal in the uplink subframe carrying the discovery or synchronization signal for D2D communication.

Referring to FIG. 7, a reference number 701 denotes a case where a terminal transmits a discovery or synchronization signal in an uplink to an eNB and a reference number 703 denotes a case where a terminal transmits a discovery or synchronization signal in an uplink for D2D communication. The base station notifies the terminal of uplink subframes 705 and 707 for transmitting D2D discovery or synchronization signal through higher layer signaling. At this time, the base station performs reception at the symbol carrying an SRS of the terminal and performs transmission at a low power level at the rest of the symbols at the subframe 707 as denoted by a reference number 717. This is because the signal which a terminal transmits to another signal for D2D communication when the base station performs transmission at relatively high power level may not be detected due to the strong signal from the base station. In order to overcome this issue, the base station may perform scheduling such that the terminal performs transmission at a very low level or mutes transmission to the base station at the corresponding subframes 705 and 707. However, since the SRS is transmitted periodically, it is difficult for the terminal to transmit SRS to the base station forcibly. For D2D communication, the discovery or synchronization signal may be transmitted as denoted by a reference number 711, a symbol 709 is not used for D2D communication based on a periodic SRS transmission from the terminal to the base station, and this region is used for switching between transmission and reception for receiving discovery or synchronization signal transmitted by another terminal after its discovery signal transmission.

FIG. 7 is directed to discovery and synchronization signal transmission where the discovery and synchronization signals are configured separately. In order to multiplex the discovery and synchronization signals, a synchronization signal 713 and a discovery signal 715 may be transmitted at different symbols. In a case of configuring the synchronization and discovery signals in different structures, the synchronization signal may be used for D2D multicast while the discovery signal may be used for D2D unicast. An embodiment of the present disclosure also includes a method for using the same type of multiple discovery signals 715 for unicast and multicast transmissions as described with reference to FIG. 5. In an embodiment of the present disclosure, the synchronization signal may be configured to use a CAZAC sequence matching the synchronization signal band given across one symbol of at least one PRB. Accordingly, in a case where a plurality of terminals perform transmission using orthogonal CAZAC sequences at the same symbol, the plurality of terminals can transmit the synchronization signals on the limited synchronization signal resource.

The terminal may transmit or receive the discovery or synchronization signal on the resource configured for discovery or synchronization signal transmission in downlink or uplink and may detect the D2D communication ID in the received discovery or synchronization signal. According to an embodiment of the present disclosure, if the multicast ID is transmitted in the synchronization signal and the unicast ID is transmitted in the discovery signal, the terminal may store the first ID set detected in all of the transmitted and received synchronization signals and the second ID set detected in all of the transmitted or received discovery signals in the memory. In another embodiment of the present disclosure, if the terminal is instructed to use some of all D2D communication IDs for unicast and the rest for multicast, the terminal may determine whether the corresponding ID included in the first or second ID set based on an ID detected independently of the discovery or synchronization signal.

Figure 8:
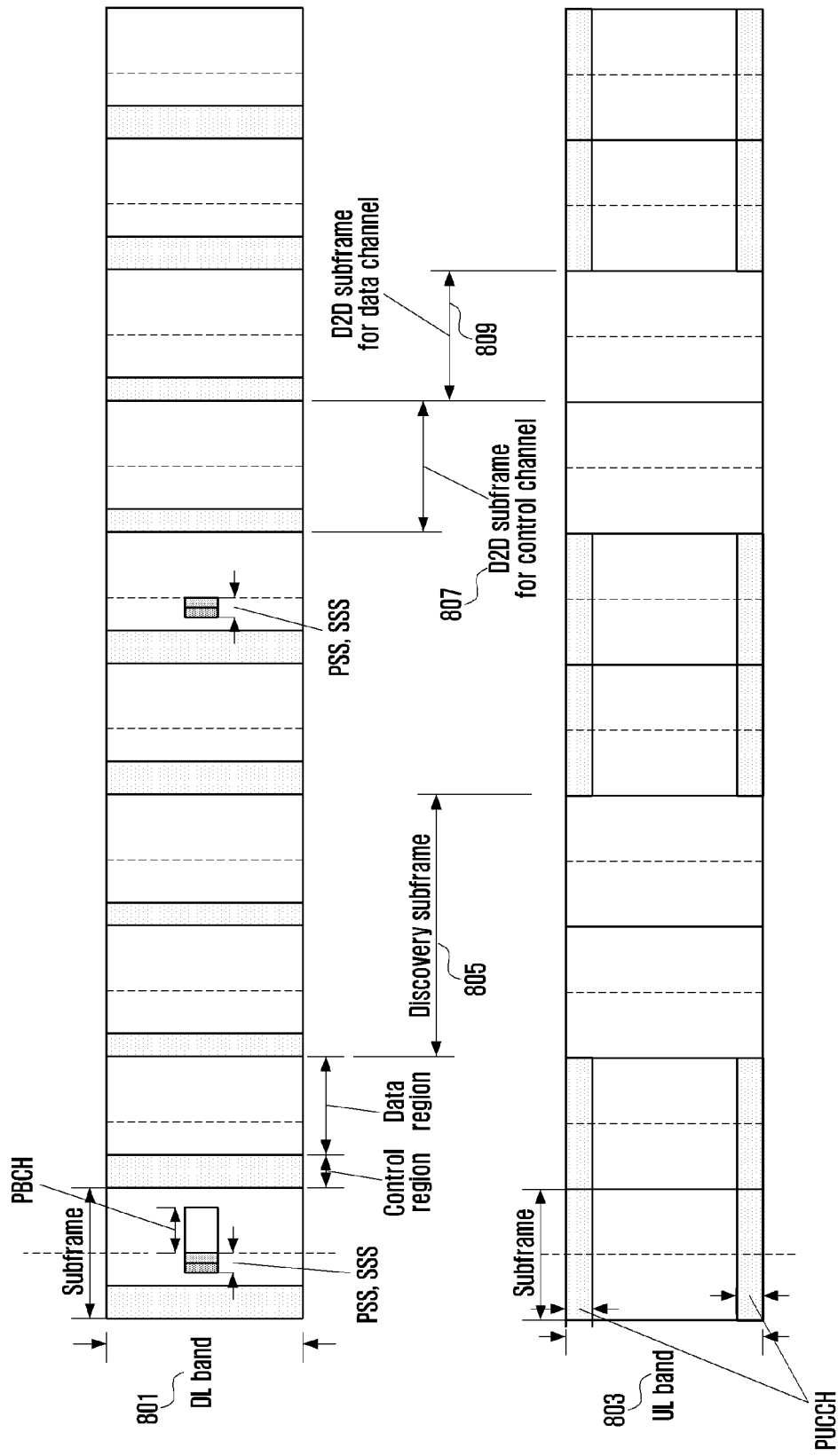
FIG. 8 is a diagram illustrating a configuration of subframe resources for D2D communication according to an embodiment of the present disclosure.

FIG. 8 is a diagram illustrating a configuration of subframe resources for D2D communication according to an embodiment of the present disclosure.

Referring to FIG. 8, the subframe resource for D2D communication includes a discovery region subframe, a D2D communication resource allocation control channel transmission subframe, and a D2D data communication subframe. The different types of subframes may be consecutive or non-consecutive depending on the configuration of the base station. Reference number 801 denotes downlink, and reference number 803 denotes uplink. The D2D communication may be configured in downlink or uplink selectively depending on the configuration of the base station or configured in one of the downlink and uplink. The D2D communication may be configured by maximizing the downlink and uplink depending on the configuration of the base station. The subframes for D2D communication include a discovery subframe 805 for discovery or synchronization signal transmission, a control channel subframe 807 for D2D control channel transmission, and a D2D data communication subframe 809 for transmitting actual D2D data that are consecutive or non-consecutive in a time domain. The subframes may be configured in downlink or uplink, or some of the subframes may be configured in downlink while the others are configured in uplink. For example, the control channel subframe 807 for transmitting the D2D communication control channel may be configured in downlink. The subframe for use in actual D2D data communication may be configured in uplink.

Figure 9:
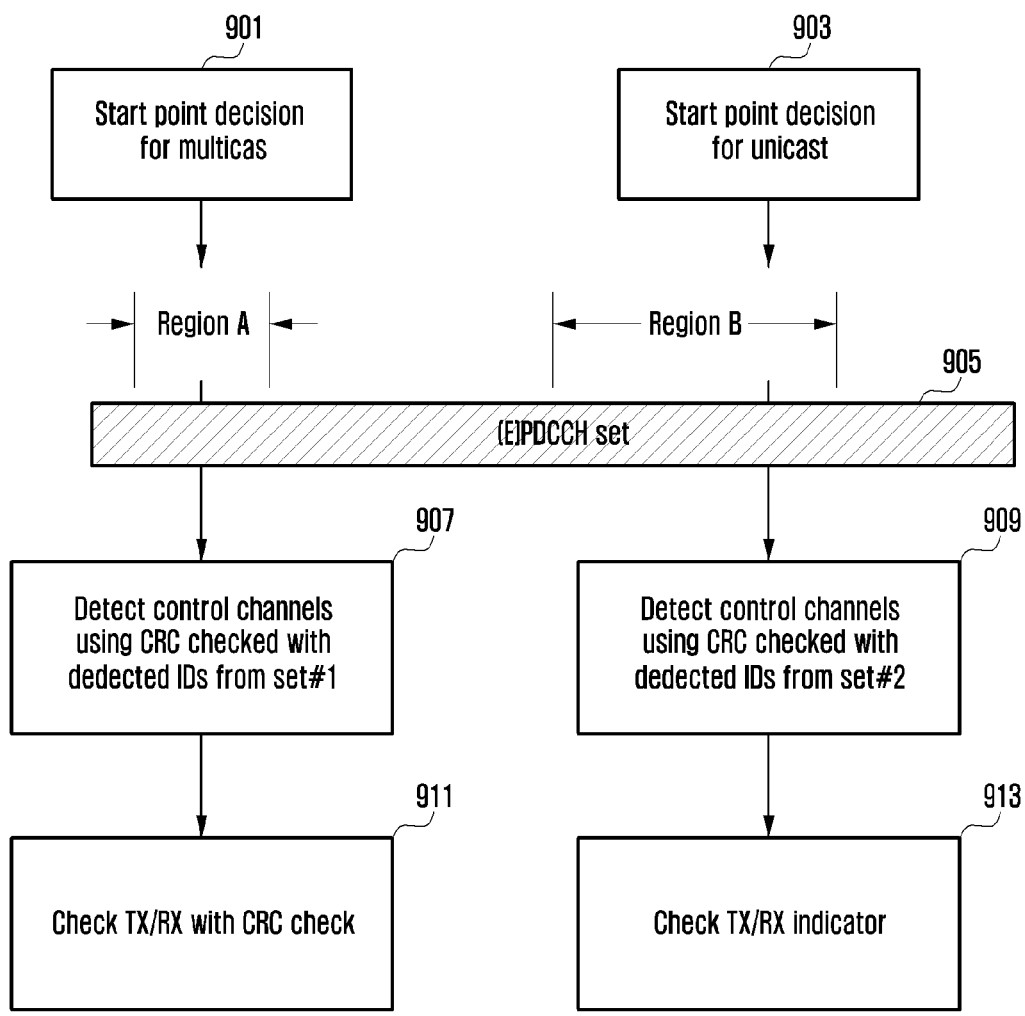
FIG. 9 is a diagram illustrating a principle of transmitting a D2D communication control channel according to a first embodiment of the present disclosure.

FIG. 9 is a diagram illustrating a principle of transmitting a D2D communication control channel according to a first embodiment of the present disclosure.

Referring to FIG. 9, the terminal receives the first and second ID sets using the discovery and synchronization signals for D2D communication and feeds back the terminal information including the D2D link channel information (i.e., Channel Quality Information (CQI), Channel State Information (CSI), and the like) used for communication to the base station. Thereafter, the base station configures the resource for D2D communication based on the feedback information received from the terminals and transmits the control channel informing the terminal of the configured resource. The terminal receives the control channel and determines the D2D communication resource region and data channel format. FIG. 9 is directed to the procedure of receiving the control channel indicated by the base station using the first and second IDs.

In the first embodiment of the present disclosure, the terminal receives a control channel region 905 transmitted by the base station, configures different control channel search regions region A and region B using the first and second ID sets, and receives the control channel in the search regions configured respectively.

At this time, the first ID set may be the identifier for multicast transmission. The terminal which receives the control channel for the first ID set may attempt receiving at least one control channel per first ID in the search region configured with the first identifier at operation 901. For this purpose, the terminal may perform a search through CRC check using the first ID set at operation 907. Different encryption schemes or error detection schemes may be used in embodiments of the present disclosure. If the CRC test is successful with the first ID it has transmitted, the terminal determines that the corresponding control channel is the control channel for multicast transmission. In addition, if the CRC test is successful with the first ID it has received, the terminal determines that the control channel is the control channel for multicast reception at operation 911.

In a case where the D2D communication control information is transmitted in downlink, the transmission terminal for multicast or broadcast may determine the downlink control channel. At this time, if CRC test is successful with the ID which it has transmitted, the reception terminal may determine the corresponding control channel as the control channel for multicast transmission. The reception terminal for multicast or broadcast may also determine the downlink control channel. At this time, if the CRC test is successful with the ID which it has received, the transmission terminal may determine the corresponding control channel as the control channel for receiving the multicast. Thereafter, the transmission terminal may perform data transmission for broadcast using the data transmission channel information determined based on the received control information. The reception terminal may receive data for broadcast using the data reception channel information determined based on the received control information. At this time, as shown in the embodiment of FIG. 9, the transmission and reception terminals may determine the same control channel, the transmission terminal may acquire the information on the data channel for broadcast data transmission, and the reception terminal may acquire the information on the data channel for receiving data.

The second ID set may be the identifier for unicast transmission. The terminal which receives the control channel for the second ID set may attempt receiving at least one control channel per second identifier in the search region configured using the second ID at operation 903. For this purpose, the terminal performs CRC check using the second ID set at operation 909. If the CRC test is successful with the second ID it has transmitted, the terminal determines that the corresponding control channel is the control channel for unicast and determines whether the corresponding data is of transmission to or reception from the terminal having the D2D communication identifier used in the successful CRC test at operation 913.

Figure 10:
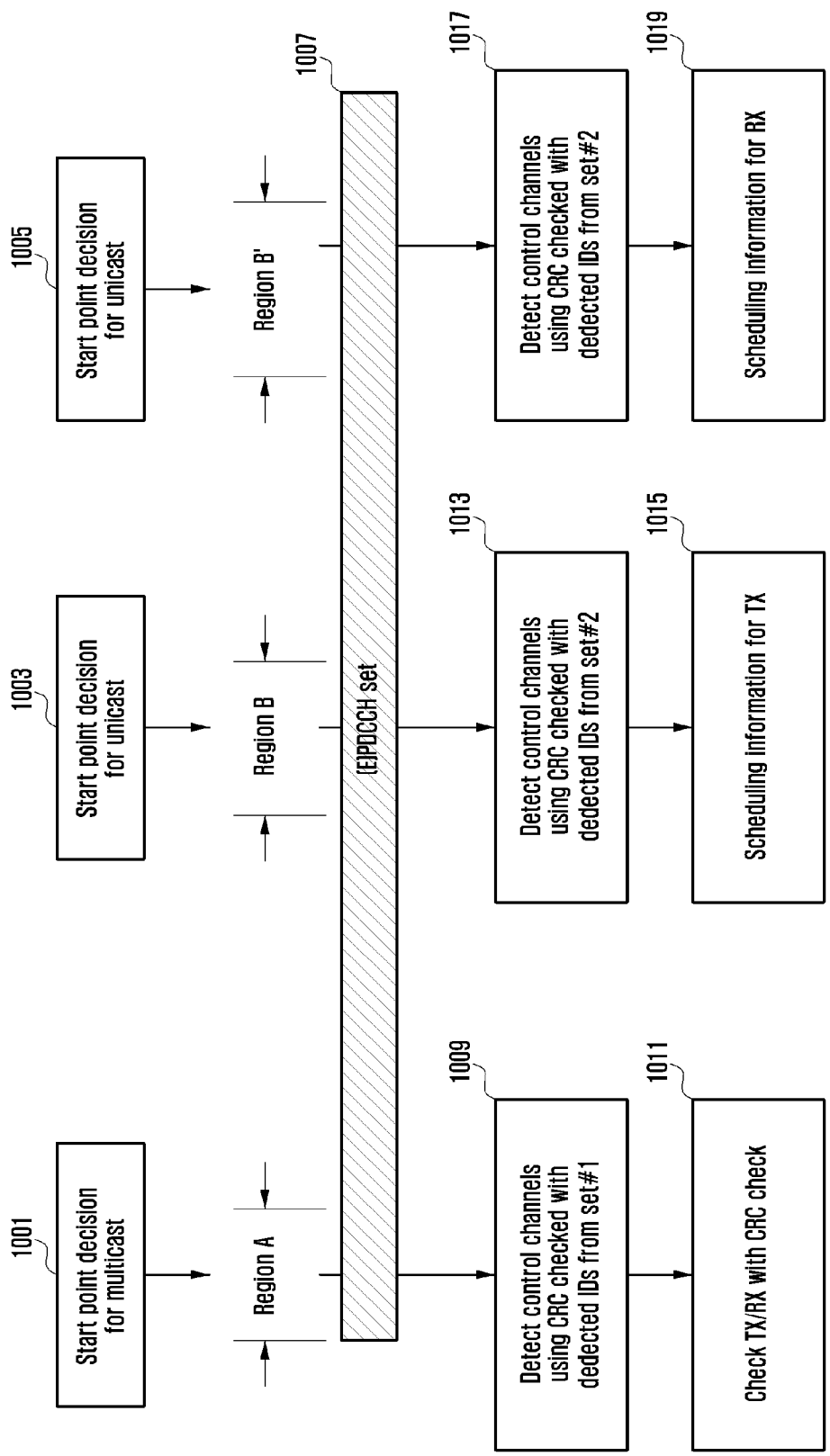
FIG. 10 is a diagram illustrating a principle of transmitting a D2D communication control channel according to a second embodiment of the present disclosure.

FIG. 10 is a diagram illustrating a principle of transmitting a D2D communication control channel according to a second embodiment of the present disclosure.

Referring to FIG. 10, the terminal receives the first and second ID sets using the discovery and synchronization signals for D2D communication and feeds back the terminal information including the D2D link channel information (CQI or CSI) used for communication to the base station. Thereafter, the base station configures the resource for D2D communication based on the feedback information received from the terminals and transmits the control channel informing the terminal of the configured resource. The terminal receives the control channel and determines the D2D communication resource region and data channel format. FIG. 10 is directed to the procedure of receiving the control channel indicated by the base station using the first and second IDs.

In the second embodiment of the present disclosure, the terminal receives the control channel region transmitted by the base station at operation 1007 and configures different control channel search regions at operations 1001, 1003, and 1005 using the first and second ID sets. At this time, the terminal may configure two different control channel search regions using the second ID set at operations 1003 and 1005.

At this time, the first ID set may be the identifier for multicast transmission. The terminal which receives the control channel for the first ID set may attempt receiving at least one control channel per first ID in the search region configured with the first identifier at operation 1001. For this purpose, the terminal may perform a search through CRC check using the first ID set at operation 1009. Different encryption schemes or error detection schemes may be used in embodiments of the present disclosure. If the CRC test is successful with the first ID it has transmitted, the terminal determines that the corresponding control channel is the control channel for multicast transmission. In addition, if the CRC test is successful with the first ID it has received, the terminal determines that the control channel is the control channel for multicast reception at operation 1011.

For example, if the D2D communication control information is transmitted in downlink, the transmission terminal for multicast or broadcast may determine the downlink control channel. At this time, if the CRC test is successful with the ID which it has transmitted, the reception terminal may determine that the corresponding control channel as the control channel for multicast transmission. The reception terminal for multicast or broadcast may also determine the downlink control channel. At this time, if the CRC test is successful with the ID which it has received, the transmission terminal may determine the corresponding control channel as the control channel for receiving multicast. Thereafter, the transmission terminal may perform data transmission for broadcast using the data transmission channel information determined based on the received control information. The reception terminal may perform data reception for broadcast using the data reception channel information determined based on the received control channel information. At this time, as shown in the embodiment of FIG. 10, the transmission and reception terminals may determine the same control channel, the transmission terminal may acquire the information on the data channel for broadcast data transmission, and the reception terminal may acquire the information on the data channel for receiving data.

The second ID set may be the identifier for unicast transmission. The terminal which receives the control channel for the second ID set may attempt receiving at least one control channel per second identifier in the two search region configured using the second ID at operation 1003 and 1005. For this purpose, the terminal performs CRC check using the second ID set at operations 1013 and 1017. If the CRC test is successful with the second ID (which it has received) in the search region at operation 1003, the terminal determines that the corresponding control channel is the transmission control channel for unicast and performs scheduling information for transmission at operation 1015 and, if the CRC test is successful with the second ID (which it has received) in the search region, the terminal determines that the corresponding control channel is reception control channel for unicast at operation 1005 and performs scheduling information for reception at operation 1019. A case where the search region and transmission/reception relationship are opposite is also included.

Figure 11:
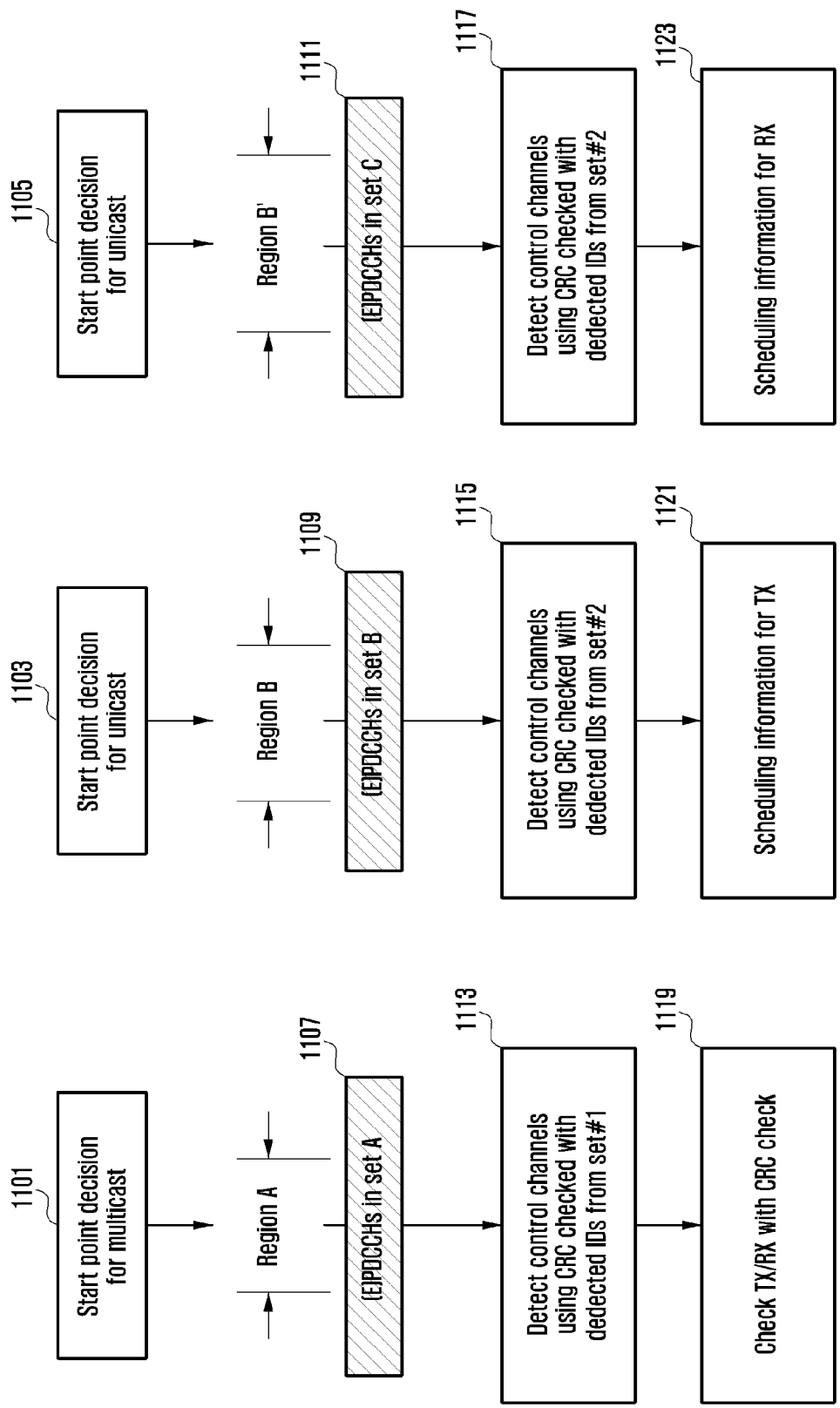
FIG. 11 is a diagram illustrating a principle of transmitting a D2D communication control channel according to a third embodiment of the present disclosure.

FIG. 11 is a diagram illustrating a principle of transmitting a D2D communication control channel according to a third embodiment of the present disclosure.

Referring to FIG. 11, the terminal receives the first and second ID sets using the discovery and synchronization signals for D2D communication and feeds back the terminal information including the D2D link channel information (CQI or CSI) used for communication to the base station. Thereafter, the base station configures the resource for D2D communication based on the feedback information received from the terminals and transmits the control channel informing the terminal of the configured resource. The terminal receives the control channel and determines the D2D communication resource region and data channel format. FIG. 11 is directed to the procedure of receiving the control channel indicated by the base station using the first and second IDs.

In the third embodiment of the present disclosure, the terminal receives the control channel region transmitted by the base station at operation 1107, 1109, and 1111. Thereafter, the terminal configures search regions in different control regions at operations 1101, 1103, and 1105 using the first and second ID sets. At this time, the terminal receives the control channel in the respective search regions.

At this time, the first ID set may be the identifier for multicast transmission. The terminal which receives the control channel for the first ID set may attempt receiving at least one control channel per first ID in the search region configured with the first identifier at operation 1101. For this purpose, the terminal may perform a search through CRC check using the first ID set at operation 1113. Different encryption schemes or error detection schemes may be used in embodiments of the present disclosure. If the CRC test is successful with the first ID it has transmitted, the terminal determines that the corresponding control channel is the control channel for multicast transmission. In addition, if the CRC test is successful with the first ID it has received, the terminal determines that the control channel is the control channel for multicast reception at operation 1119.

In a case where the D2D communication control information is transmitted in downlink, the transmission terminal for multicast or broadcast may determine the downlink control channel. At this time, if CRC test is successful with the ID which it has transmitted, the reception terminal may determine the corresponding control channel as the control channel for multicast transmission. The reception terminal for multicast or broadcast may also determine the downlink control channel. At this time, if the CRC test is successful with the ID which it has received, the transmission terminal may determine the corresponding control channel as the control channel for receiving the multicast. Thereafter, the transmission terminal may perform data transmission for broadcast using the data transmission channel information determined based on the received control information. The reception terminal may receive data for broadcast using the data reception channel information determined based on the received control information. At this time, as shown in the embodiment of FIG. 11, the transmission and reception terminals may determine the same control channel, the transmission terminal may acquire the information on the data channel for broadcast data transmission, and the reception terminal may acquire the information on the data channel for receiving data.

The second ID set may be the identifier for unicast transmission. The terminal which receives the control channel for the second ID set may attempt receiving at least one control channel per second identifier in the two search regions configured in different control regions 1109 and 1111 using the second ID at operation 1103 and 1105. For this purpose, the terminal performs CRC check using the second ID set at operation 1115 and 1117. If the CRC test is successful with the second ID (which it has received) in the search region at operation 1103, the terminal determines that the corresponding control channel is the transmission control channel for unicast and performs scheduling information for transmission at operation 1121 and, if the CRC test is successful with the second ID (which it has received) in the search region, the terminal determines that the corresponding control channel is a reception control channel for unicast at operation 1105 and performs scheduling information for reception at operation 1123. A case where the search region and transmission/reception relationship are opposite is also included.

Figure 12:
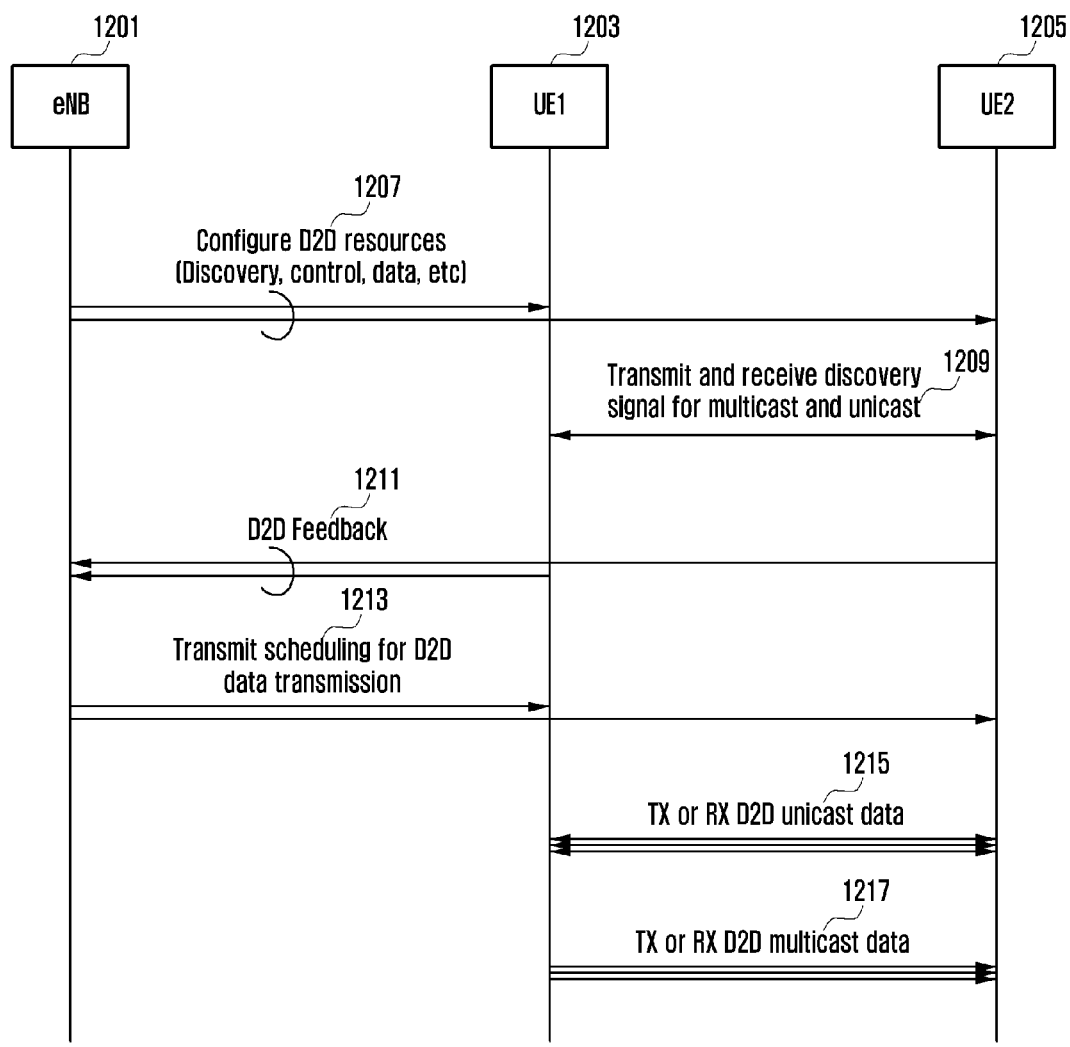
FIG. 12 is a flow diagram illustrating signal flows between a base station and terminals for D2D communication according to an embodiment of the present disclosure.

FIG. 12 is a flow diagram illustrating signal flows between a base station and terminals for D2D communication according to an embodiment of the present disclosure.

Referring to FIG. 12, a base station 1201 configures a resource for D2D communication between terminals 1203 and 1205 at operation 1207. The configured D2D resource may include a D2D discovery and synchronization channel resource, at least one D2D communication ID, a D2D communication control channel, and data channel transmission information. If the resource configuration information is received, the terminals 1203 and 1205 may transmit the discovery or synchronization signal in the resource region configured as indicated by the base station and may receive the discovery or synchronization signals transmitted by other terminals at operation 1209. Thereafter, the terminal feeds back the information on the first and second ID sets received through the discovery or synchronization signal and the information on the channel between the terminals to the base station at operation 1211. The base station 1201 configures the resource for D2D communication based on the feedback information and the control channel for informing the terminal of the configured resource and transmits the control channel to the terminal at operation 1213. Each terminal receives the control channel according to the control channel reception operation, detects the control channel information on the multicast or unicast transmission/reception, and performs multicast transmission/reception at operation 1217 or unicast transmission/reception at operation 1215.

Figure 13:
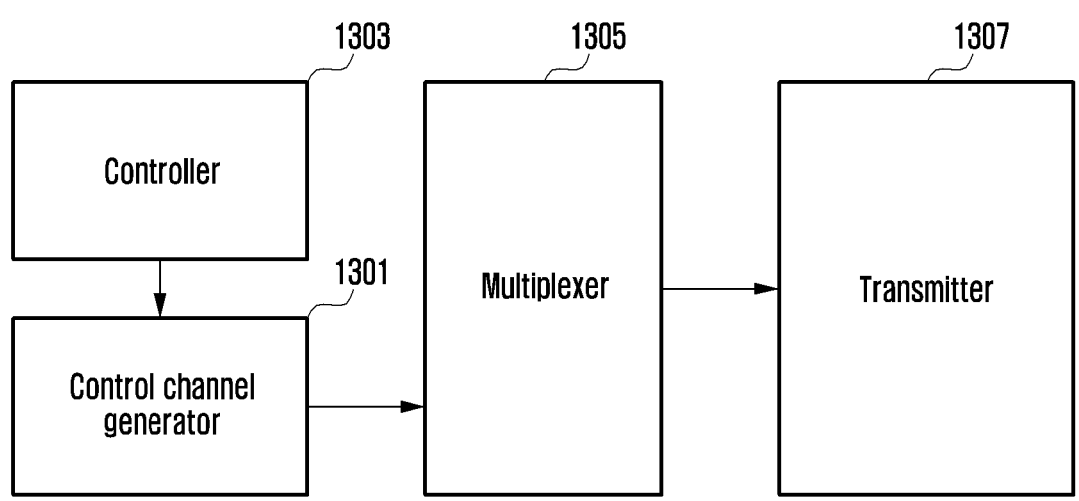
FIG. 13 is a block diagram illustrating a configuration of a base station according to an embodiment of the present disclosure.

FIG. 13 is a block diagram illustrating a configuration of a base station according to an embodiment of the present disclosure.

Referring to FIG. 13, a controller 1303 configures a higher layer signal for D2D communication using a control channel generator 1301 and multiplexes the signaling with the data channel using a multiplexer 1305. If the terminal transmits the feedback information on the link between the terminals, the base station configures a resource for D2D communication based on the link information, generates the control information using the control channel generator 1301, and transmits the control information to the terminal using a transmitter 1307 at the region indicated through higher layer signaling.

More specifically, the controller 1303 configures the resource region for D2D discovery or synchronization signal, informs the terminal of the resource region, and indicates the discovery or synchronization signal used by each terminal. The base station also assigns a terminal identifier for use in unicast or multicast of the terminal.

Figure 14:
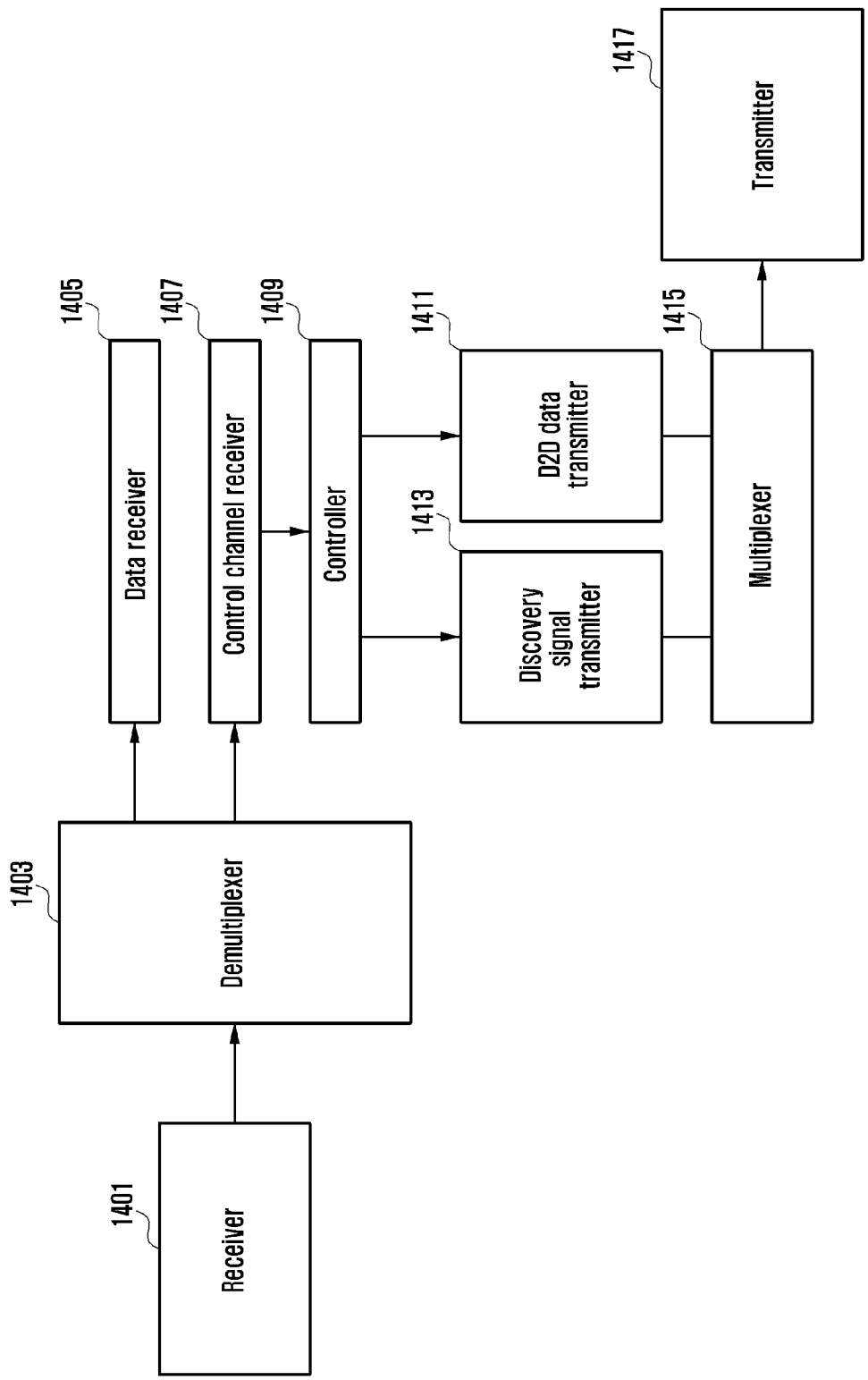
FIG. 14 is a block diagram illustrating a configuration of a terminal according to an embodiment of the present disclosure.

FIG. 14 is a block diagram illustrating a configuration of a terminal according to an embodiment of the present disclosure.

Referring to FIG. 14, a controller 1409 receives the base station signal from the base station using a receiver 1401 and demultiplexes the signal into the control channel, a data channel, and other signals using a demultiplexer 1403. If the D2D communication configuration information is received, the controller 1409 generates the discovery or synchronization signal using a discovery/synchronization signal generator 1413 and multiplexes the signal into the transmission subframe using a multiplexer 1415, the multiplexed signal being transferred to a transmitter 1417. Thereafter, if the control channel information for D2D communication which is transmitted by the base station is received using a control channel receiver 1407, the controller 1409 transmits, if transmission operation is required according to the scheduling information carried in the control channel, the data channel using the D2D communication transmitter 1411 and receives, if any reception is needed, the D2D communication signal using a data channel receiver 1405. For example, in a case of the broadcast transmission terminal, the terminal controller 1409 which has received the control channel information through the control channel receiver 1407 may perform the transmission operation based on the scheduling information indicated in the control channel as described above. In a case of the broadcast reception terminal, the terminal controller 1409 which has received the control channel information through the control channel receiver 1407 may perform reception operation based on the scheduling information indicated in the control channel as described above.

As described above, the D2D communication method and apparatus of the present disclosure is advantageous in that the D2D terminal is capable of transmitting the discovery or synchronization signal to discover the neighbor terminals without disturbing downlink or uplink communication between the base station and cellular terminal and the base station configures the resource for D2D communication so as to support D2D communication without inter-device interference.

As described above, the D2D communication method and apparatus of the present disclosure is advantageous in that the D2D terminals communicate without assistance of base stations and interference to the cellular communication between the base station and another terminal by configuring a signal capable of detecting the presence of a terminal and services supported by the terminal and transmitting the configured signal.

In addition, the D2D communication method and apparatus of the present disclosure is advantageous in that the base station manages the communication resource for D2D communication without disturbing the cellular communication so as to mitigate interference between D2D and cellular communication and facilitate data communication.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A communication method for a terminal in a mobile communication system, the method comprising:
   collecting, from another terminal, a multicast identifier of the other terminal for use in multicast communication;
   transmitting the collected multicast identifier to a base station (BS);
   receiving a multicast control channel for device-to-device (D2D) multicast communication;
   performing cyclic redundancy check (CRC) on the received multicast control channel using the collected multicast identifier; and
   receiving, if the CRC is successful, the D2D multicast based on the multicast control channel.

2. The method of claim 1, further comprising:
   performing CRC on the multicast control channel using an identifier of the terminal; and
   transmitting, if the CRC is successful, the D2D multicast based on the multicast control channel.

3. The method of claim 1, further comprising:
   receiving a unicast control channel for D2D unicast communication;
   performing CRC on the unicast control channel using a unicast reception identifier of the terminal; and
   receiving, if the CRC is successful, D2D unicast based on the unicast control channel.

4. The method of claim 1, further comprising:
   receiving a unicast control channel for D2D unicast communication;
   performing the CRC on the unicast control channel using a unicast transmission identifier of the terminal; and
   transmitting, if the CRC is successful, D2D unicast transmission according to based on the unicast control channel.

5. The method of claim 1, further comprising feeding back information on the collected multicast identifier and D2D channel.

6. A terminal of a mobile communication system, the terminal comprising:
   a transceiver configured to transmit and receive a signal;
   a controller configured to:
      control the transceiver to collect, from another terminal, a multicast identifier of the other terminal for use in multicast communication,
      control the transceiver to transmit the collected multicast identifier to a base station (BS);
      control the transceiver to receive a multicast control channel for device-to-device (D2D) multicast communication,
      perform cyclic redundancy check (CRC) on the received multicast control channel using the collected multicast identifier, and
      control the transceiver to receive, if the CRC is successful, the D2D multicast based on the multicast control channel.

7. The terminal of claim 6, wherein the controller is further configured to:
   perform CRC on the multicast control channel using an identifier of the terminal, and
   control the transceiver to transmit, if the CRC is successful, the D2D multicast based on the multicast control channel.

8. The terminal of claim 6, wherein controller is further configured to:
   control the transceiver to receive a unicast control channel for D2D unicast communication,
   perform CRC on the unicast control channel using a unicast reception identifier of the terminal, and
   control the transceiver to receive, if the CRC is successful, D2D unicast based on the unicast control channel.

9. The terminal of claim 6, wherein the controller is further configured to:
   control the transceiver to receiving a unicast control channel for D2D unicast communication,
   perform the CRC on the unicast control channel using a unicast transmission identifier of the terminal, and
   control the transceiver to transmit, if the CRC is successful, D2D unicast transmission based on the unicast control channel.

10. The terminal of claim 6, wherein the controller is further configured to feed back information on the collected multicast identifier and D2D channel.

* * * * *